United States Patent [19]

Trenkler

[11] 4,212,050
[45] Jul. 8, 1980

[54] SWINGABLE SEARCHLIGHT FOR VEHICLES, ESPECIALLY PASSENGER VEHICLES

[75] Inventor: Werner Trenkler, Asperg, Fed. Rep. of Germany

[73] Assignee: Dr. Ing. h.c.F. Porsche Aktiengesellschaft, Fed. Rep. of Germany

[21] Appl. No.: 876,946

[22] Filed: Feb. 10, 1978

[30] Foreign Application Priority Data

Feb. 26, 1977 [DE] Fed. Rep. of Germany ....... 2708374

[51] Int. Cl.$^2$ ............................................. B60Q 1/06
[52] U.S. Cl. ...................................... 362/65; 362/66; 362/287; 362/324; 362/371; 362/418; 362/419; 362/422; 362/428
[58] Field of Search ...................... 362/39, 63, 65, 66, 362/67, 287, 322, 324, 371, 372, 418, 419, 422, 427, 428

[56] References Cited

U.S. PATENT DOCUMENTS

| | | | |
|---|---|---|---|
| 1,552,752 | 9/1925 | Maynard | 362/419 |
| 1,578,025 | 3/1926 | Grigsby | 362/421 |
| 1,741,788 | 12/1929 | Moru | 362/422 |
| 2,454,931 | 11/1948 | Larson | 362/422 |

*Primary Examiner*—Howard A. Birmiel
*Attorney, Agent, or Firm*—Craig & Antonelli

[57] ABSTRACT

A retractable searchlight for vehicles of the type which is movable from a working position to a retracted position includes at least one searchlight supported by a supporting device mounted upon a shaft which is rotatably driven by a motor. The supporting device is formed of at least two members, a first of which is secured to the shaft for movement therewith and a second of which is secured to the searchlight and is mounted so as to be displaceable relative to the shaft. Between the first and second members a disengagement means is located for enabling the second member connected to the searchlight to be displaced with the first member between the working a retracted positions during normal operation and for disengaging the first member from the second member when the searchlight encounters a resistance so that continued movement of the searchlight is interrupted thereby precluding injury to the arrangement or persons standing nearby.

14 Claims, 3 Drawing Figures

SWINGABLE SEARCHLIGHT FOR VEHICLES, ESPECIALLY PASSENGER VEHICLES

BACKGROUND AND SUMMARY OF THE INVENTION

The invention relates to a swingable searchlight for vehicles, especially passenger vehicles which are arranged mounted on a shaft so as to be movable from a working position into a submerged (retracted) rest position by means of an operating device which cooperates with the shaft whereby a device is provided between the shaft and the searchlight for interrupting the movement of the searchlight when the searchlight encounters resistance thereto. The device comprises at least two members, the first of which is arranged firmly on the shaft and the second of which is arranged in a manner which is rotatably relative to the first member.

With a known searchlight of the type mentioned at the outset (DT-OS No. 23 62 798), shortly before the searchlight reaches its submerged (retracted) position, a resistance is encountered, the engine is overloaded and disconnected to prevent the possibility of a person standing at the vehicle being injured. However, this is possible only over a definite range on the basis of the construction of the two members disclosed therein and the holding device has the effect that, with the engagement of a resistance outside this range, the engine may be damaged and a person may be injured. Therefore, it is an object of the present invention to take such measures that the described disadvantage is avoided.

According to an aspect of the invention, the above-noted problem is solved as a result of a disengageable searchlight supporting device being provided between the first member and the second member. Advantageously, in a preferred embodiment the device is associated with the first member and includes a spring-loaded lever which supports itself by a gliding member at a recess in the second member. The recess is provided with a runway for the gliding member. The lever is double-armed and a tension spring is attached to one end and the gliding member provided at the other end. In the using position of the searchlight, the first member spans the second member against the stop at the superstructure. The second member is connected with a housing accommodating the searchlight. The second member includes two bearing eyes arranged at a distance one from the other and cooperates with the shaft whereby between these bearing eyes a bearing eye of the first member is arranged. The members are arranged one above the other such that the device is arranged in a center longitudinal plane of the two members.

Thus, it is plain that an advantage is obtained in that the disengageable device between the members ensures that when in any position of the searchlight during the retraction process, a resistance is encountered, the first member will be separated from the second member so that damage to the electric motor and/or injuries to persons, is avoided. The construction of the device is simple and operates in a functionally safe manner. The arrangement of the members on the shaft as well as the device between the members creates favorable conditions space-wise.

These and further objects, features and advantages of the present invention will become more obvious from the following description when taken in connection with the accompanying drawings which show, for purposes of illustration only, a single embodiment in accordance with the present invention.

DETAILED DESCRIPTION OF A PREFERRED EMBODIMENT OF THE INVENTION

Figure 1:
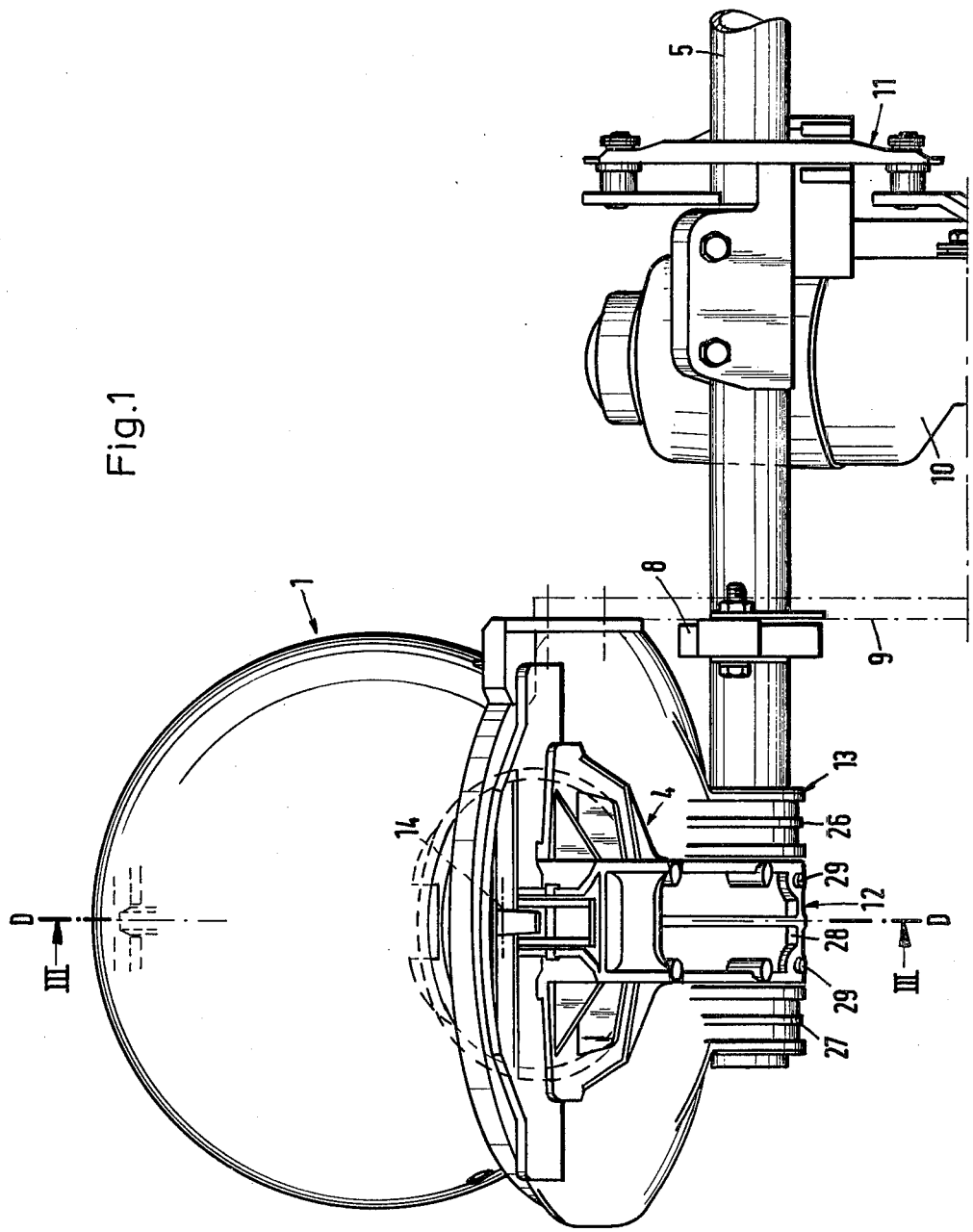
FIG. 1 shows a view from the rear of the extended searchlight.

The searchlight 1 is arranged in the bow 2 of a passenger motor vehicle 3 and is placed at a disengageable searchlight supporting device 4. The disengageable device 4 is arranged on a shaft 5 extending transversely to the direction of driving A in such a way that the searchlight 1 can be swung from a using position B into a retracted position C. The control disk 6 of the searchlight 1 extends in the position C, in about a plane corresponding to the body structure 7. By means of this position and the arrangement of shaft 5, seen in the direction of driving in the front area of the searchlight 1, the searchlight executes a rotating motion in the direction of driving A during the extending process.

Shaft 5 is held at a wall 9 of the body structure by means of a bearing 8 and is operated by an electric motor 10 and a crank gear 11.

The disengageable supporting device 4 comprises two lever-like constructed members 12, 13. The first member 12 is solidly connected with shaft 5. The second member 13 is rotatably mounted on the shaft 5. A disengaging device 14 is provided between the first member 12 and the second member 13. This device 14 is mounted on the first member 12 and includes a spring-loaded lever 15 which is supported at 16. Lever 15 is provided with a gliding part 17 (such as a roller) which supports itself in a recess 18 of the second member 13. The recess 18 is provided with a runway 19 for the gliding part 17 onto which a further runway 20 is connected.

The lever 15 is constructed double-armed whereby a spring 22 is attached to one end 21 thereof and the gliding part 17 is provided at the other end 23.

In the using position B of the searchlight 1, the first member 12 spans the second member 13 against a stop 24 (FIG. 2) at the body structure. The second member 13 is provided with a housing 25 accommodating the searchlight 1.

Over and above, the second member 13 provided with bearing eyes 26, 27 which are arranged on the shaft 5 at a distance one from the other. Between these bearing eyes, a bearing eye 28 of the first member 12 is arranged. The bearing eye 28 is held against rotation thereof on shaft 5 by means of pins 29, while bearing eyes 26, 27 are not.

Further, members 12, 13 are arranged one above the other and in such a manner that they arrive at the abutment in a common plane 30. At the same time, the disengaging device 14 is provided in a central longitudinal plane D—D of both members 12, 13.

Figure 2:
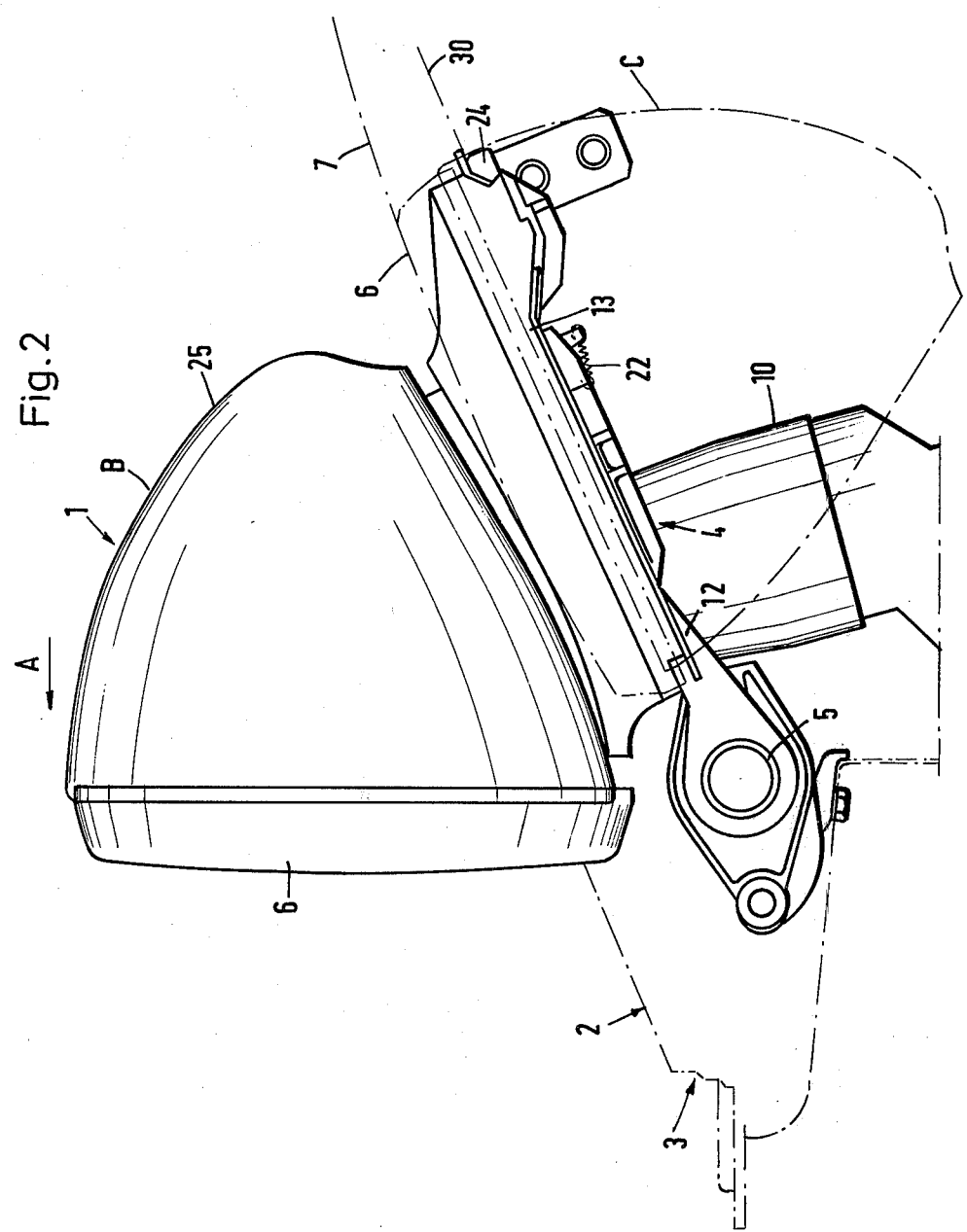
FIG. 2 shows a side view of FIG. 1.
Figure 3:
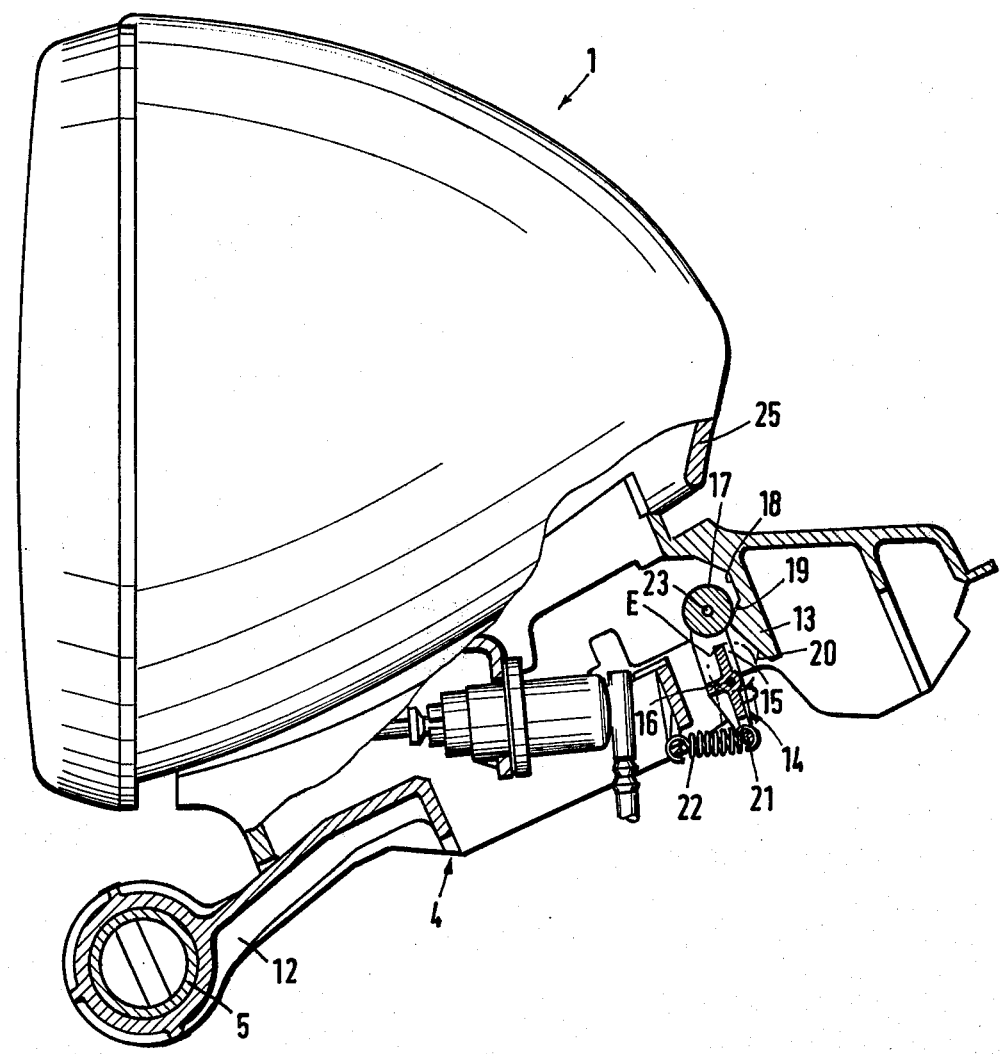
FIG. 3 shows a section along line III—III of FIG. 1 in an enlarged scale.

The mode of operation of the invention is explained in a simple manner with reference to FIGS. 2 and 3. For retracting of the searchlight 1, the electric motor 10 is operated from the passenger compartment. If, during this process, in any phase thereof, a resistance (body member of a person, snow, or the like) is encountered, disengaging device 14 becomes effective; that is, the first member 12, which is solidly connected with shaft 5, is carried further and the gliding part 17 moves along the recess 19 of the recess 18 as the force of spring 22 is overcome. With this, lever 15 executes a swinging motion and spring 22 is extended until the gliding part 17 is disengaged (dot-dash line, position E in FIG. 3). The first member 12 is now guided further into that position which corresponds to the position of the retracted searchlight. On the other hand, the second member 13 remains in the position at which the resistance was encountered as the shaft 15 is able to rotate relative thereto. If the resistance is removed, the searchlight 1, subject to its own weight and the position of shaft 5, arrives at its retracted position. If the resistance, for example, snow, remains and the searchlight is to be extended, the device 14 will again be brought into engagement during the extending process of the searchlight; that is, both members 12 and 13 will again be in the initial engaged position as they will mate together when the part 12 is raised during the extending process.

While I have shown and described one embodiment in accordance with the present invention, it is understood that the same is not limited thereto but is susceptible of numerous changes and modifications as known to those skilled in the art and I therefore do not intend to cover all such changes and modifications as known to those skilled in the art and I therefore do not wish to be limited to the details shown and described herein but intend to cover all such changes and modifications as are encompassed by the scope of the appended claims.

I claim:

1. A retractable searchlight for vehicles which is movable from a working position to a retracted position comprising:
    (a) at least one searchlight;
    (b) a drive shaft and an operating device cooperating therewith for causing rotation of said shaft; and
    (c) a supporting device for supporting said searchlight upon said shaft, said supporting device comprising at least two members a first of which is secured to the shaft for movement therewith and the second of which is connected to said searchlight and is mounted so as to be displaceable relative to said shaft, disengagement means between said first and second members for enabling said second member connected to said searchlight to be displaced with said first member between said working and retracted positions during normal operation and for disengaging said first member from said second member when said searchlight encounters a resistance, whereby continued movement of said searchlight is interrupted.

2. A retractable searchlight according to claim 1, wherein said disengagement means comprises a spring-loaded lever arranged on one of said two members which cooperates with a recess provided on the other of said two members.

3. A retractable searchlight according to claim 2, wherein said lever is arranged on the first of said two members and has a gliding part which engages said recess in an engaged position.

4. A retractable searchlight according to claim 3, wherein the recess is provided with a runway for the gliding part.

5. A retractable searchlight according to claim 3, wherein the lever is double-armed, a tension spring is attached to one end thereof, and said gliding part is provided at the other end.

6. A retractable headlight according to claim 2, wherein the first and second of said two members are arranged one above the other and the disengagement means is located in a central longitudinal plane of both of the two members.

7. A retractable searchlight according to claim 1, wherein the first of said two members spans the second of said two members and engages against a stop of the vehicle body structure to which the searchlight is associated.

8. A retractable searchlight according to claim 1, wherein the second member is connected to a housing accommodating the searchlight.

9. A retractable headlight according to claim 8, wherein the first and second of said two members are arranged one above the other and the disengagement means is located in a central longitudinal plane of both of the two members.

10. A retractable searchlight according to claim 1, wherein the second member is provided with two bearing eyes which are arranged at a distance one from the other and operatively cooperating with the shaft, and wherein the first member is provided with a bearing which is arranged between the bearing eyes of the second member.

11. A retractable headlight according to claim 1, wherein the first and second of said two members are arranged one above the other and the disengagement means is located in a central longitudinal plane of both of the two members.

12. A retractable searchlight according to claim 1, wherein the operating means comprises a drive motor for rotating said drive shaft, said disengagement means enabling said drive shaft and first member to be displaced from said working position to said retracted position by said drive motor during both normal operation and with said first and second members disengaged by said resistance.

13. A retractable searchlight according to claim 12, wherein said disengagement means constitutes means for re-engaging said first and second members upon removal of said resistance and upon shifting of said shaft and first member from said retracted position to said working position even though said resistance remains.

14. A retractable searchlight according to claim 1, wherein said disengagement means constitutes means for re-engaging said first and second members upon removal of said resistance and upon shifting of said shaft and first member from said retracted position to said working position even though said resistance remains.

* * * * *